United States Patent [19]
Clarke

[11] 3,777,172
[45] Dec. 4, 1973

[54] METHOD AND APPARATUS FOR MEASURING THE CLUMPING OF PLATELETS IN WHOLE BLOOD

[76] Inventor: Noel Clarke, Meadow Ct., Stillorgan Park, Blackrock, Ireland

[22] Filed: Oct. 29, 1971

[21] Appl. No.: 193,965

[30] Foreign Application Priority Data
Oct. 29, 1970   Ireland .................................... 1382

[52] U.S. Cl....250/575, 356/39, 356/197, 250/576
[51] Int. Cl. ........................................... G01n 21/26
[58] Field of Search ................... 250/218; 356/39, 356/40, 41, 42, 196, 197, 198, 201, 204, 205; 23/230 R, 230 B, 253 R

[56] References Cited
UNITED STATES PATENTS

| | | | |
|---|---|---|---|
| 3,488,156 | 1/1970 | Good | 356/39 |
| 3,492,396 | 1/1970 | Dalton | 356/39 |
| 3,549,994 | 12/1970 | Rothermel | 356/39 |
| 3,586,484 | 6/1971 | Anderson | 356/39 |
| 3,518,012 | 6/1970 | Franklin | 250/218 |
| 3,615,140 | 10/1971 | Doornekamp | 250/218 |
| 3,617,222 | 11/1971 | Matte | 356/39 |

*Primary Examiner*—Archie R. Borchelt
*Assistant Examiner*—D. C. Nelms
*Attorney*—Eric H. Waters et al.

[57] ABSTRACT

A method of measuring clumping of platelets in whole blood uses a centrifuge having at least one transparent treatment chamber, radiation sensing means for sensing light transmission through the chamber and agitation means giving a reproduceable amount, and number of cycles of, agitation to the contents of the or one chamber, a comparison being made between the measurement on an agitated and centrifuged test sample and the measurement on a centrifuged reference sample.

21 Claims, 5 Drawing Figures

METHOD AND APPARATUS FOR MEASURING THE CLUMPING OF PLATELETS IN WHOLE BLOOD

BACKGROUND OF THE INVENTION

The present invention relates to a method and apparatus for measuring the clumping of platelets in whole blood.

One of the major problems in combating cardiovascular disease today is the lack of a suitable test for detecting thrombotic tendencies in whole blood.

It is known that patients who are prone to arterial thrombosis show non-specific changes, for example raised cholesterol, in the blood but there are conflicting reports regarding the adhesiveness or aggregation of platelets in individual high-risk patients. Nevertheless it appears to be likely that arterial thrombosis occurs in a blood which may include increased lipids, fragile red cells, stickly platelets and altering haemo-dynamic factors with possible damage to the vessel wall.

There have been significant advances in recent years, such as the observations that the aggregation of platelets in stirred platelet-rich plasma (PRP) can be monitored by measuring the light transmission after the addition of an aggregation agent. It has also been discovered within the last decade or so that red cells contain a substance, namely Adenosine Diphosphate (ADP), which can induce platelet adhesiveness and platelet aggregation.

Various methods have been used to measure the rate of clumping of platelets in plasma on the addition of an additive such as ADP. There are unfortunately a number of serious disadvantages in the conventional methods for observing platelet aggregation or clumping in PRP following the addition of commercial additives.

1. The aggregation of platelets is observed in PRP from which red cells, which are a known source of ADP, and white cells, which are a constant component of a thrombus, have been removed.
2. The preparation of PRP involves separation of the cell (solid)phase from the plasma (fluid) phase. Consequently, such platelets in PRP are being tested in a plasmatic environment in which all the plasma factors and the platelets are in higher concentration than that operative in the original whole blood.
3. PRP is normally produced by centrifuging the whole blood and unfortunately this process may damage fragile red cells leading to platelet clumping and sedimentations of the stickiest platelets together with the red cells and accordingly the resultant PRP may be lacking some of the stickiest platelets.
4. An additional problem is that bloods of different individuals have different erythrocyte sedimentation rates and this obviously influences the effect of the centrifugation even under standardised conditions.
5. It has been found that during increased aggregation of platelets in PRP larger and larger clumps of platelets are being swirled into the light path of the photoelectric cell which is used to measure the amount of light transmitted thus interfering with the net electrical output from the cell and preventing the monitoring of the true light transmission of the intervening plasma.
6. It has been found that the initial tiny platelet aggregation in PRP, which may be important, cannot be detected by conventional light transmission techniques. In fact I have found using conventional techniques that almost 35 percent of the platelets must be removed or clumped in PRP before the first ten percent increase in light transmission takes place.

With this in view certain methods have been devised for measuring the clumping of platelets in whole blood. One such method comprises the passing of a sample of whole blood through a length of glass tubing which contains a number of tightly packed glass beads, counting the number of clumps of platelets in the sample of blood after it has passed through the length of tubing and comparing this with the number of platelets in a similar sample of whole blood which has not passed through the glass beads. This method suffers from the following disadvantages:

1. It is laborious and time consuming.
2. It is often difficult to obtain uniformity of result due to difficulties in obtaining consistent packaging of the glass beads and the tubing.
3. There is no evidence that glass is similar to endothelium and the test conditions of passage through glass beads does not remotely resemble the intravascular situation of thrombosis.

According to one aspect of the invention there is provided a method of measuring the clumping of platelets in samples of whole blood, wherein each sample is subjected to the following steps:

making a reference measurement by centrifuging sample material constituting at least a part of the sample, by passing into the plasma zone of the thus centrifuged sample material radiation which is affected by the presence of platelets and by sensing the effect on said radiation of sample material; and making a test measurement by treating sample material constituting at least a part of the sample, in the same way for each sample, by means comprising agitation so as to cause clumping of platelets, by centrifuging the thus treated sample material, by passing into the plasma zone of said treated sample material said radiation and by sensing the effect on said radiation of said treated sample material.

In some embodiments of the method, the reference and test measurements are effected on different portions of each sample. In other embodiments, the reference and test measurements are effected on the same sample material. Moreover, in the first case, the reference and test measurements may involve simultaneous centrifuging and simultaneous radiation sensing preferably using the same source. In the second case, and possibly also in the first, the measurements are successive, but preferably again use the same source and preferably the same treatment chamber for centrifuging.

According to a second aspect of the invention, there is provided an apparatus for measuring the clumping of platelets in samples of whole blood comprising: a treatment chamber having radiation transmissive portions by which radiation of a kind affected by the presence of platelets can be passed into and out of said chamber; means for automatically producing a reproduceable amount of agitation, generated by accelerations and decelerations of said chamber, of a sample in said chamber, to cause clumping of platelets in said sample; means for rotating said chamber to centrifuge its contents; and means for detecting the amount of said radiation passing out of said chamber.

The aforesaid reference and test measurements can be effected in the same treatment chamber. Alternatively, the measurements can be made in two treatment chambers.

For batch testing, there may be a plurality of treatment chambers so that each measurement can be effected simultaneously on a plurality of samples.

A reference measurement may precede and/or follow the testmeasurement, depending upon the nature of the or each reference measurement. In one case, a reference measurement involves no clumping treatment and thus can precede the test measurement on the same sample material. Another reference measurement involves the use of an additive and agitation to produce substantially complete clumping and may thus follow the test measurement on the same sample material.

DESCRIPTION OF DRAWINGS

For a better understanding of the invention and to show how the same may be carried into effect, reference will now be made, by way of example, to the accompanying drawings, in which.

Figure 1:
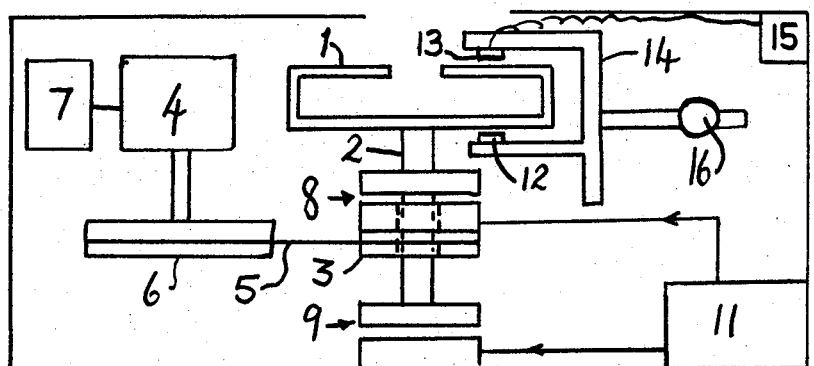
FIG. 1 is a diagram of a first embodiment of a centrifugal apparatus for measuring the clumping of platelets in whole blood.

The apparatus shown in FIG. 1 comprises a cylindrical transparent treatment chamber 1 mounted on a shaft 2 which is in turn mounted on bearings (not shown) of known construction. On the shaft is loosely mounted a pulley 3 which is driven by an electric motor 4 through a belt 5 and a pulley 6 of large mass. The motor has a speed control circuit 7 which may be of any conventional construction. The pulley 3 is connected to one part of a magnetic drive clutch 8 the other part of which is carried by the shaft 2. A magnetic brake clutch 9 couples the shaft 2 and a support or housing 10 of the apparatus. The clutches are energised on an exclusive basis by a pulse generator 11.

A light source 12 and an associated photo-electric cell 13 are held at opposite sides of the transparent treatment chamber by a support 14 so that, in use, a beam of light from source 12 will be transmitted through the plasma zone in the transparent treatment chamber 1 and parallel to its shaft 2. The photo-electric cell 13 is connected in conventional manner to a voltmeter 15, thus allowing the optical density of a fluid in the transparent treatment chamber to be measured.

In use, a first sample of whole blood will be introduced through an inlet port 16 into the treatment chamber 1. The motor 4 and pulse generator 11 will be started so that the transparent treatment chamber will build up speed towards a value preset by circuit 7 such as speed of thousands of r.p.m. As will be apparent the pulse generator must commence its operation by energising the drive clutch 8 without energising the brake clutch. The chamber will continue to rotate at high speed for a desired time, whereafter the photocell and the light source will be used to measure the quantity of light transmitted through the plasma zone of the sample in the chamber. This measurement constitutes a reference value.

The pulse generator 11 will then be switched to its automatic agitation mode. As before, this causes the drive clutch to be energised to drive the chamber. After a short time, for example about one second, the pulse generator energises the brake clutch and de-energises the drive clutch and maintains the brake clutch energised for a short time, for example about one second. The motor will however come to a rest in less than that time. This cycle of acceleration and deceleration is repeated a preset plurality of times. Thus the transparent treatment chamber 1 is stopped and started violently several times, causing the platelets in the blood to clump. After a certain number of cycles, when the platelets have clumped, the pulse generator will be switched to continuous operation to cause the transparent treatment chamber to be rotated at high speed, thus centrifuging the clumps of platelets to the exterior of the transparent treatment chamber 1. After the clumps of platelets have been centrifuged, the photo-electric cell and light source will be used again to measure the quantity of light transmitted through the plasma zone of the sample in the treatment chamber. The sample of blood is removed from the transparent treatment chamber and the transparent treatment chamber is purged in conventional manner with a saline solution so that a further sample of blood can be introduced for a new measurement. The two measured quantities of light transmitted through the sample will be compared and used as a measure of the susceptibility of the patient from whom the sample blood has been taken to coronary thrombosis.

Details of the apparatus will now be described.

Figure 2:
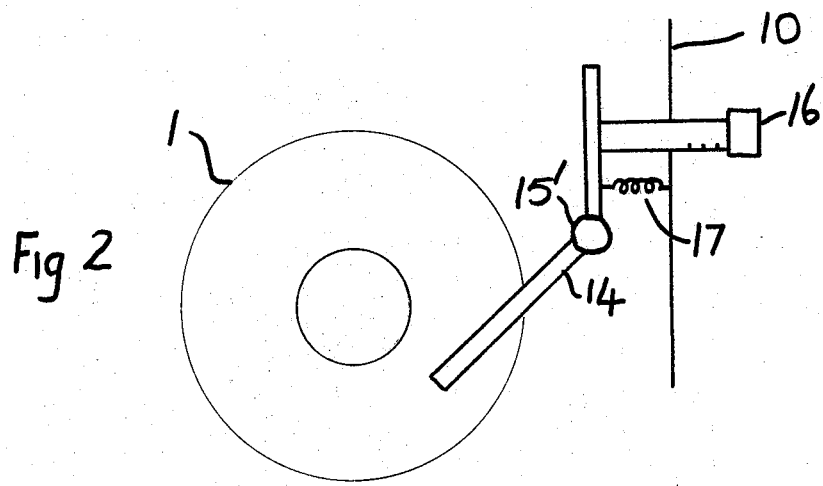
FIG. 2 shows a detail of FIG. 1.

FIG. 2 is a plan view of the chamber 1 showing the mounting of the support 14 of the photocell and light source. The support is pivotally mounted about an axis 15' and is biased against a micrometer screw device 16 by a spring 17. The radial position of the support 14 can thus be adjusted. In practice, the optical axis joining the light source and photocell will be located about one third of the way from the meniscus to the periphery of the centrifugal blood so as to intercept the plasma zone containing unclumped platelets.

Figure 3:
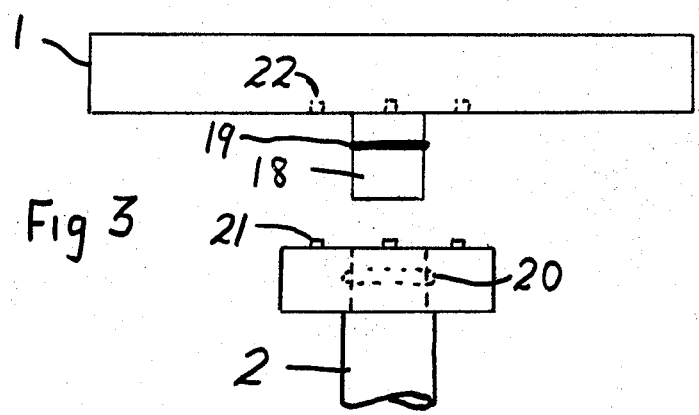
FIG. 3 shows a further detail of FIG. 1.

FIG. 3 shows a quick release mounting for the chamber 1, which enables samples to be tested in quick succession using a plurality of such chambers.

The chamber 1 has a stub shaft 18 to engage in a hole 19 open at the upper end of shaft 2. The shaft 18 has a groove containing an O-ring 19 to be pressed into a corresponding groove 20 in the hole 19. For drive transmission the shaft 2 carries three pegs 21 and the chamber has three corresponding recesses 22.

Figure 4:
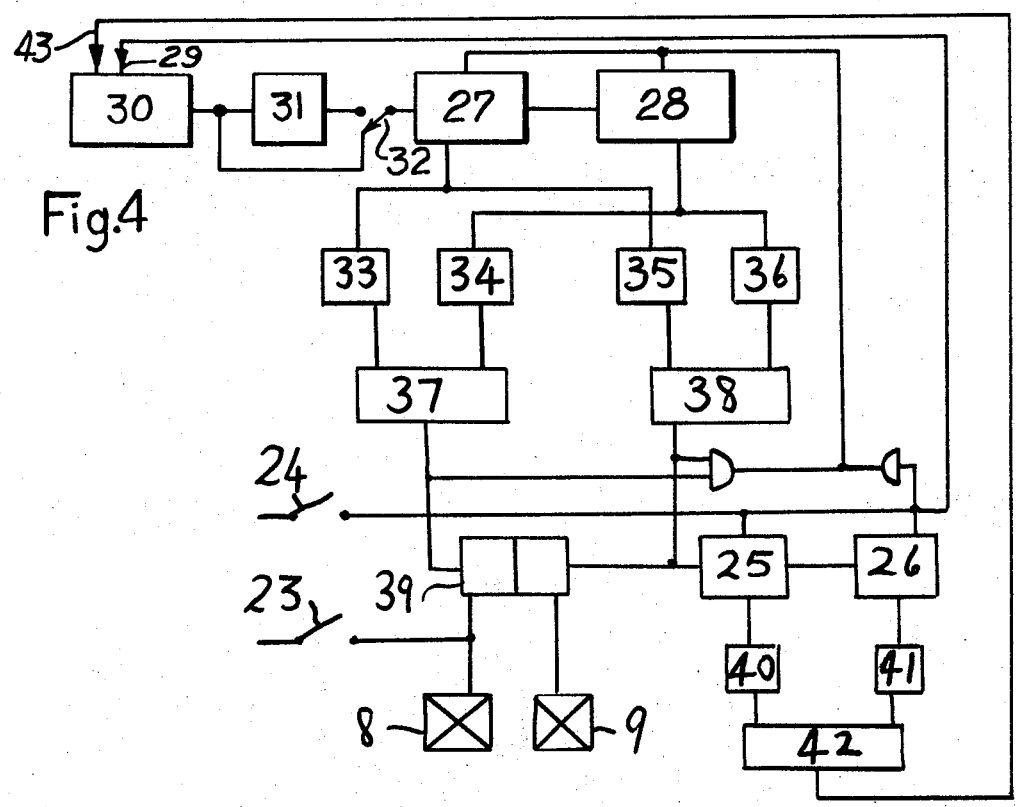
FIG. 4 is a block circuit diagram of a variable mark/space ratio generator.

FIG. 4 is a block diagram of the pulse generator for operating the clutches 8 and 9.

For the centrifuging mode, a switch 23 is closed to energise the solenoid 8 only.

In the agitating mode, the switch 24 is closed. This closure will reset a counter formed by divide-by-10 stages 25 and 26 and a counter formed by divide-by-10 stages 27 and 28.

The closure will also energise a conductor 29 to set into operation a mains-controlled oscillator 30 feeding counter 27, 28 possibly via a divide-by-two stage 31 depending upon the position of a switch 32.

The divide-by-10 stages 27 and 28 feed two sets of decade switches 33, 34 and 35, 36. Switches 33 and 34 are manually settable to predetermine in units and tenths of a second respectively the drive time and switches 35 and 36 are manually settable to predetermine in units and tenths of a second respectively the braking time. When the time data delivered by stages 27 and 28 corresponds to the times set at switches 33, 34 or switches 35, 36, the corresponding one of two coincidence units 37 and 38 feeds a signal to a corresponding input of a bistable trigger circuit 39 which controls the alternating operation of the clutches 8 and 9. Thus, the drive of the chamber via clutch 8 continues for a time set by switches 33 and 34 and the braking exists for a time set by switches 35 and 36.

It will be noted however, that the chamber 1 normally stops long before the end of the set braking time because of the low inertia of the oscillating parts, including the chamber 1, compared to the inertia of the continuously rotating parts constituted by motor 4, pulley-flywheel 6, pulley 3 and part of clutch 8.

The cycle of acceleration and deceleration will be repeated for a number of times (up to 99) manually set at decade switches 40 and 41 which represent tens and units respectively. When the set value is reached, a coincidence unit 42 feeds a signal to an input 43 of oscillator 30 to stop its operation.

Figure 5:
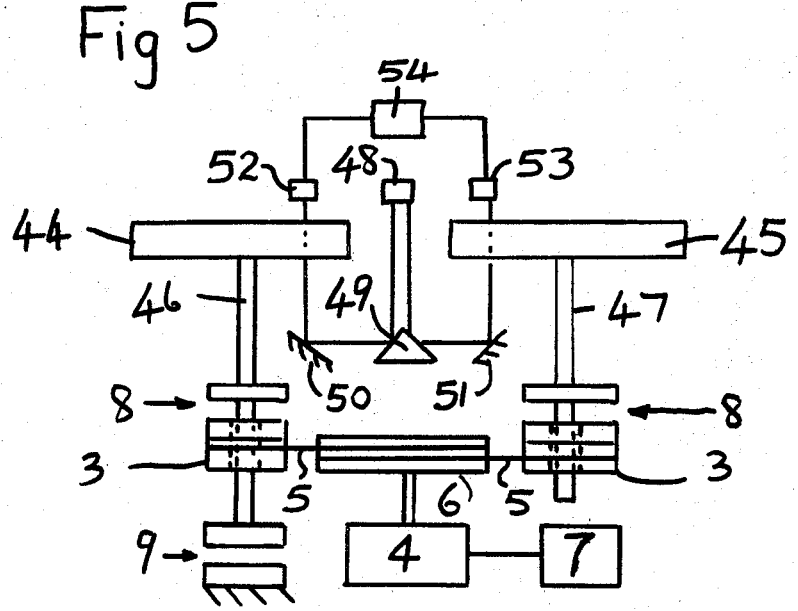
FIG. 5 is a diagram of a modification of the apparatus of FIG. 1.

An alternative embodiment of the invention shown in FIG. 5 has two cylindrical transparent treatment chambers 44 and 45 which are mounted on shafts 46 and 47. One of the transparent treatment chambers 44 is by the means already described adapted to be stopped, started and rotated in alternate directions. The other transparent treatment chamber is adapted first to be rotated by the same motor 4. A light source 48, an associated prism 49, mirrors 50 and 51 and two photo-electric cells 52 and 53 are provided and so arranged that the light source transmits a relatively narrow beam of light to the prism which in turn splits the beam of light into two separate beams of light of equal intensity, the two separate beams of light being transmitted by the mirrors through the transparent treatment chambers to the photoelectric cells which are located at that side of the transparent treatment chamber remote from the prism. The beams of light transmitted are transmitted parallel to the axis of the transparent treatment chambers.

In operation, a sample of whole blood is divided into two smaller samples which are placed in respective ones of the transparent treatment chambers. The sample in the transparent treatment chamber 44, referred to as the test sample, is agitated violently by the apparatus and is then centrifuged; the other sample, referred to as the base or reference sample, is merely centrifuged. When the base sample and the other sample have been centrifuged for a sufficient time to ensure cohesive samples, the clumps of platelets in the transparent treatment chamber 44 will be driven by the centrifugal force to the outer edges of the transparent treatment chamber; any clumps of platelets in the base sample will also be forced to the outer edges of its transparent treatment chamber 45. The single platelets will remain in suspension in both samples.

The light source 48 delivers a beam of light through each of the transparent treatment chambers. The quantity of light transmitted to each transparent treatment chamber is measured by the photo-electric cells. The electrical voltage signal from the photo-electric cells are combined electrically by a differential amplifier 54 to give a measure of the difference in the quantity of light transmitted to the photo-electric cells.

When the quantity of light transmitted through each of the transparent treatment chambers has been measured, the chambers are removed and cleared by a suitable purging agent, such as saline.

In the methods proposed above it has been assumed that the thrombotic tendency of blood has been measured by comparing the light transmission through the treated sample with the light transmission through a base sample, which does not contain any clumped platelets other than those already in the blood.

In an alternative, it is envisaged that the base sample may be treated by prolonged agitation alone and/or by the addition of an additive (ATP) to cause all the platelets to clump and thus on centrifuging it to get the clearest plasma zone possible and hence the maximum light transmission. The comparison can then be made between the light transmitted through the treated sample and the maximum light transmission possible.

Instead of measuring merely light transmission, one can modify the embodiments to measure light transmission at axially offset locations to obtain a measure of light scattering by platelets. The or each photo-cell will thus be mounted in an axially displaceable manner so that it can occupy two preset positions.

In another modification, the test measurement may be made by producing clumping partially with the aid of a predetermined amount of an additive. Less agitation may then be needed, for example only two cycles of agitation.

It is also proposed that the described embodiments could be modified to achieve successive testing of samples by the use of a pump, e.g. a peristaltic pump, to pump successive samples intermittently into the or each treatment chamber, each sample being purged at the end of a test by the pump pumping into the or each chamber a purging agent such as saline.

In another modification it is proposed to test a plurality of samples simultaneously by having a rotor containing a plurality of treatment chambers in the form of cells, as in analytical centrifugation. Alternatively, the chambers might be formed as test tubes pivotally supported by a spider or other swing-out rotor. In each case, the chambers will be inspected on-by-one during rotation by the optical system.

Finally, it must be noted that radiation other than visible light, e.g. ultra-violet radiation, could be used to test the transmission or scattering properties of the plasma zone. Moreover, instead of a transmissive chamber 1, a chamber with transmissive inlet and outlet windows may be used.

I claim:

1. A method of measuring the clumping of platelets in samples of whole blood, wherein each sample is subjected to the following steps:
   a. making a reference measurement upon sample material constituting at least a part of said sample by the following three operations (1) to (3) whilst substantially maintaining throughout said operations the initial amount of clumping of platelets in said sample material, said operations being, (1) centrifuging said sample, (2) passing radiation which is affected by the presence of platelets into said sample in a plasma zone thereof from which particles of blood travel outwardly during centrifuging and (3) sensing the effect on said radiation, in said plasma zone, of said sample; and b. making a test measurement upon sample material constituting at least a part of said sample, in the same way for each sample, by the following four operations (4) to (7), said operations being (4) treating said sample material by means comprising agitation so as to cause clumping of platelets, (5) centrifuging the thus treated sample material, (6) passing said radiation into the plasma zone in said treated sample material, and (7) sensing the effect on said radiation, in said plasma zone, of said treated sample material.

2. A method as claimed in claim 1, wherein, in said operation (4), clumping is produced in said sample material by agitating said material in a centrifuge chamber in which it is subsequently centrifuged.

3. A method as claimed in claim 2, wherein clumping is assisted by adding an additive to said sample material.

4. A method as claimed in claim 1, wherein said reference and test measurements are effected successively.

5. A method as claimed in claim 4, wherein said measurements are effected on the same sample material.

6. A method as claimed in claim 1, wherein said measurements are effected on different portions of each of said samples.

7. A method as claimed in claim 1, wherein said effects on said radiation are compared with each other.

8. A method as claimed in claim 1, wherein said radiation is light.

9. A method as claimed in claim 6, wherein the same source of said radiation is used for both of said portions of each sample.

10. A method as claimed in claim 1, wherein centrifuging is effected in at least one chamber having radiation transmissive walls.

11. A method as claimed in claim 3, including the step of pumping said sample material into said centrifuge chamber.

12. An apparatus for measuring the clumping of platelets in samples of whole blood comprising: a radiation source, the radiation of which is of a kind which is influenced by the presence of platelets in the path of said radiation; a treatment chamber having radiation transmissive portions by which said radiation can be passed into and out of said chamber; means and repeatedly and automatically subjecting said chamber to a predetermined amount of agitation, in each case by accelerations and decelerations of said chamber, to cause clumping of platelets in said sample; means for rotating said chamber to centrifuge its contents; and means for detecting the amount of said radiation passing out of said chamber.

13. An apparatus as claimed in claim 12, and comprising a second, treatment chamber having radiation transmissive portions by which said radiation from said source can be passed into and out of said second chamber, detecting means for detecting the amount of radiation passing out of said second chamber, and means for rotating said second chamber to centrifuge its contents.

14. An apparatus as claimed in claim 13, wherein a pump is connected to feed said chambers.

15. An apparatus as claimed in claim 12, wherein said radiation is light.

16. An apparatus as claimed in claim 12, wherein said agitation means and said rotating means comprise a motor coupled to said chamber by a drive clutch, and a braking clutch coupled to said chamber.

17. An apparatus as claimed in claim 16, wherein said agitation means comprises a pulse generator for supplying to said clutches respective pulse trains each having a predetermined number of pulses with a predetermined mark/space ratio.

18. An apparatus as claimed in claim 17, wherein said generator comprises a bistable trigger circuit having two stages connected to respective ones of said clutches.

19. An apparatus as claimed in claim 18, wherein said generator comprises adjusting means for adjusting said ratio and said number.

20. A method of measuring the clumping of platelets in samples of whole blood, wherein each sample is subjected to the following steps:

a. making a reference measurement upon sample material constituting at least a part of said sample by the following four operations (1) to (4), said operations being (1) treating said sample material to a clumping operation to produce clumping of substantially all platelets, (2) centrifuging said sample material, (3) passing radiation which is affected by the presence of platelets into said sample in a plasma zone thereof from which particles of blood travel outwardly during centrifuging and (4) sensing the effect on said radiation, in said plasma zone, of said sample material; and b. making a test measurement upon sample material constituting at least a part of said sample, in the same way for each sample, by the following four operations (5) to (8), said operations being (5) treating said sample material by means comprising agitation so as to cause clumping of platelets, (6) centrifuging the thus treated sample material, (7) passing said radiation into the plasma zone in said treated sample material, and (8) sensing the effect on said radiation, in said plasma zone, of said treated sample material.

21. A method as claimed in claim 1, wherein said operation (1) of said reference measurement is effected with the aid of a clumping additive and with agitation to produce clumping of substantially all platelets prior to said operation (2) of centrifuging.

* * * * *